Aug. 27, 1929.   B. STEVENS   1,726,246
TRANSMISSION
Filed Feb. 27, 1928

INVENTOR.
BYRON STEVENS
BY Harry C. Schroeder
ATTORNEY.

Patented Aug. 27, 1929.

1,726,246

UNITED STATES PATENT OFFICE.

BYRON STEVENS, OF OAKLAND, CALIFORNIA.

TRANSMISSION.

Application filed February 27, 1928. Serial No. 257,149.

The invention forming the subject matter of this application relates to transmissions for automotive vehicles and particularly to transmissions of the sliding gear type.

In the ordinary sliding gear systems of transmissions, the power is transmitted from the clutch shaft to a counter shaft and then thru the counter shaft gears to the sliding gears on the transmission square shaft. In the usual systems, the gear reduction between the counter shaft gear and the sliding transmission gear must be such as to rotate the sliding gear at the exact speed at which the transmission square shaft is to be rotated. This gear reduction produces great strain and stress on the transmission gearing.

The reverse transmission gear in the ordinary transmission of the above type is rotated from the counter shaft reverse gear thru an idler gear for reverse. Therefore, the rotation of the reverse gear, when in mesh with the idler gear, is in the opposite direction to the rotation of the low, second, and high speed sliding gears.

The primary object of my invention is the provision of a transmission in which the greater part of the power at all speeds is transmitted from the clutch shaft to the driven shaft thru a differential gearing connecting the two shafts and in which the desired speed ratio is obtained by the rotation of the differential housing in the same direction as the clutch shaft but at a different speed.

Another object of the invention is the provision of a transmission in which the gears shifted rotate in the same direction and in which the speed ratio between the sliding gears and the counter shaft gears is materially less than the same in the ordinary transmission, whereby the shifting of the gears is made easier and the possibility of clashing of gears during the shifting is materially reduced.

A still further object of the invention is the provision of a transmission in which the reverse sliding gear is rotated in the same direction as the sliding gears for the forward speeds, the reversal of the driven shaft being accomplished by the rotation of the differential housing by said reversed gear at a speed less than half of the speed of rotation of the clutch shaft, the reversal being effected by the differential gearing in the differential housing.

A further object of the invention is the provision of a transmission in which the greater part of the thrust is taken up in a differential gearing connecting the clutch shaft and the driven shaft, and this, in connection with the smaller ratio of reduction between the transmission gear and the sliding gear, renders the shifting more positive and results in the more quiet running of the transmission gearing than in any other transmission used at present.

Another object of the invention is to transmit the power from a clutch shaft to a driven shaft thru a differential gearing so that the speed ratio between the clutch shaft and the driven shaft is determined by the rotation of the differential housing at a different speed than the clutch shaft, the differential gearing being so designed that when the differential housing and the differential gears therewith are rotated at a speed half of the speed of rotation of the clutch shaft, then the driven shaft is at a standstill; while the rotation of the housing at a speed higher than the half of the speed, but less than the speed of rotation of the clutch shaft, will cause the driven shaft to rotate in the same direction as the clutch shaft, but at a lower speed. The rotation of the differential housing in the same direction as the clutch shaft, but at a speed less than half the speed of rotation of the clutch shaft, will cause the driven shaft to rotate in the reverse direction and at a lower speed than the clutch shaft.

With the foregoing and other objects in view, my invention resides in the combination and arrangement of parts and in the details of construction, hereinafter described and claimed, it being understood that changes in the precise embodiment of the invention, hereinafter disclosed, may be made within the scope of the appended claims without departing from the spirit of the invention.

The invention is clearly illustrated in the accompanying drawings in which—

Figure 1:
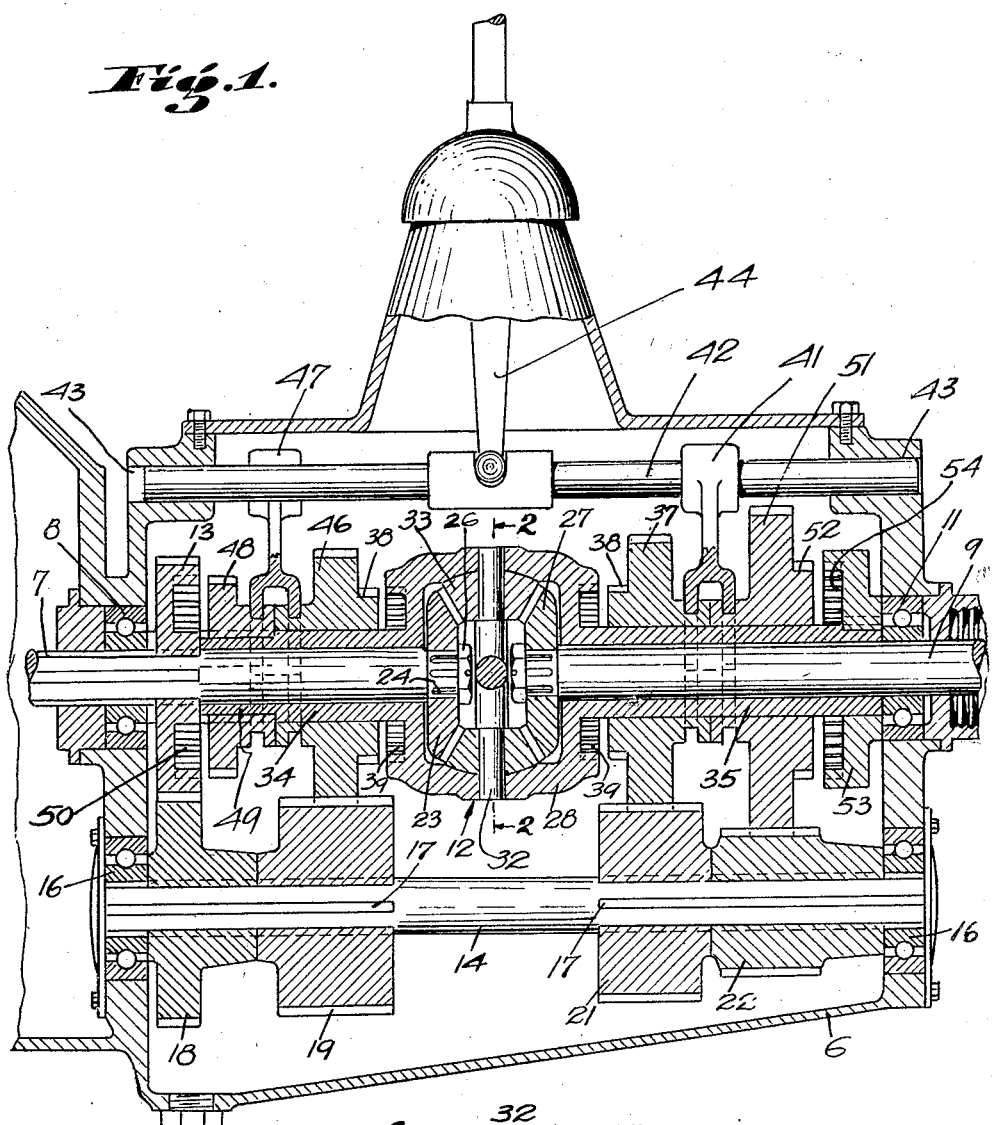
Figure 1 is a sectional view of the transmission.
Figure 2:
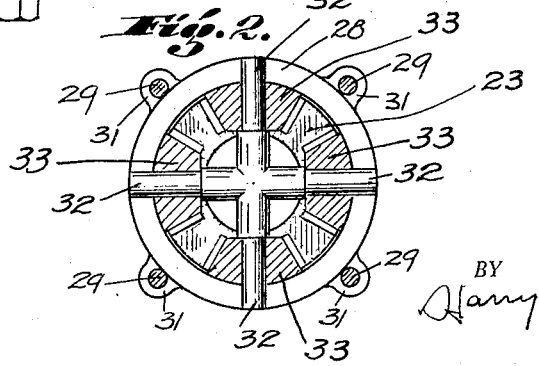
Figure 2 is a cross section of the differential gearing, the section being taken on the line 2—2 of Figure 1.

Referring to the accompanying drawing on which similar reference characters designate similar parts thruout, the various figures described above adequately illustrate my invention, and the following detailed description is commensurate with the above mentioned drawing, enabling an artisan to construct and assemble the constituent parts of the same.

In carrying out my invention, I make use of a transmission casing, denoted by the numeral 6, in which is rotatably supported a clutch shaft or driving shaft 7 in a ball bearing 8. A driven shaft 9 is rotatably supported in a ball bearing 11 in the other end of the transmission casing 6. The shafts 7 and 9 are connected to each other by means of a differential, designated in its entirety by the numeral 12. On a splined end of the clutch shaft 7 is disposed a main drive gear 13 which always rotates with the shaft 7. Below the shafts 7 and 9 and in parallelism therewith is a counter shaft 14 rotatably supported in ball bearings 16 in the opposite ends of the transmission casing 6. The opposite ends of the counter shaft 14 are splined as at 17, and on the opposite splined portions 17 are disposed a counter shaft drive gear 18, which is constantly in mesh with the main drive gear 13, a counter shaft second speed gear 19 at one end of the counter shaft 14, and at the other end thereof is disposed a counter shaft low speed gear 21 and a counter shaft reverse gear 22. The counter shaft gears being on the splined portions 17 of the counter shaft 14 are constantly rotated by the main drive gear 13.

The differential 12 comprises a beveled gear 23 secured on a reduced end 24 of the clutch shaft 7 and is held in place by means of a lock nut 26. Another bevel gear 27 is similarly secured to the end of the shaft 9. The bevel gears 23 and 27 are disposed near the opposite sides of a differential housing 28 which is constructed in two halves secured to each other by means of bolts 29 extending thru complementary lugs 31 on the adjoining faces of the differential housing halves. The face of each half of the differential housing 28 is provided with four complementary semicylindrical grooves which, when the halves are assembled, form four holes disposed in pairs at right angles to each other. In these grooves are secured spindles 32 forming a spider. On the spindles 32 are rotatably disposed four differential bevel gears 33 constantly in mesh with the bevel gears 23 and 27. Sleeves 34 and 35 extend from the opposite sides of the differential housing 28.

The rotation of the main driving gear 13 is transmitted thru the counter shaft drive gear 18 to the counter shaft 14, the rotation of which, in turn, is transmitted to the differential 12 by means of sliding gears disposed on the sleeves 34 and 35. A low speed sliding gear 37 is rotatable and slidable on the sleeve 35 and is constantly in mesh with the low speed counter shaft gear 21. At the face of the low speed sliding element 37 adjacent to the differential housing 28 is a clutch element 38. The adjacent face of the housing 28 has a complementary clutch element 39 cut therein for cooperating with the clutch element 38 when the gear is shifted in low speed. The shifting of the gear 37 is accomplished by a shifting yoke 41 moved by a gear shift rod 42 which, in turn, is slidable in holes 43 in the casing 6, the sliding of the shifting rod 42 being effected by a gear shift lever 44 of the usual construction. When the gear shift lever is moved so as to slide the gear shift rod 42 in the direction of the engine end of the casing 6, the yoke 41 causes the gear 37 to slide on the sleeve 35 until the clutch element 38 thereon is in driving engagement with the internal clutch element 39 on the differential housing 28, whereby the power is transmitted from the counter shaft 14 thru the counter shaft gear 21 to the differential 12. The disconnection of the low speed sliding gear 37 is similarly effected by shifting the yoke 41 in the opposite direction.

For second speed, a second sliding gear 46 is slidably and rotatably supported on the sleeve 34 and is constantly in mesh with the second speed counter shaft gear 19. The gear 46 is shifted by means of a yoke 47 and by a gear shift rod disposed in parallelism with the gear shift rod 42 and beyond the same, as looking at Figure 1. The movement of the gear shift lever 44 is the standard shift from one rod to the other so that when the second speed gear 46 is to be brought into driving engagement with the differential housing 28, the yoke 47 is moved toward the power take-off end of the casing 6, thereby sliding the second speed gear 46 toward the face of the differential housing 28. The second speed sliding gear 46 is provided with a clutch element 38 similar to the clutch element on the low speed sliding gear 37, and the opposite faces of the housing 28 are symmetrically finished, both being provided with an internal clutch element 39 complementary to the clutch elements 38. It will be noted that the gear ratio between the low speed gears 21 and 37 is much higher than the gear ratio between the counter shaft gear 19 and the sliding gear 46, the latter ratio effecting the rotation of the differential housing at a higher speed than the low gear ratio.

A high speed sliding gear 48 is slidably secured on a splined end 49 of the sleeve 34, so that the shifting of the yoke 47 moves the gear 48 toward the main drive gear 13. The gear 48 directly connects the housing 28 to the main drive gear 13 when in engagement with an internal clutch element 50 in said main driving gear.

A reverse sliding gear 51 is disposed on the sleeve 35 adjacent to the low speed sliding gear 37 and is actuated by the same yoke 41. The reverse sliding gear 51 is rotated by the reverse counter shaft gear 22 in the same direction as all the other sliding gears, but it is to be noted that the gear ratio between the gears 22 and 51 is such that the gear 51 is caused to rotate at a lower speed than half of the speed of rotation of the clutch shaft 7. A clutch element 52 is formed on the face of the reverse sliding clutch element 51. A reverse driven clutch element 53 is fixedly secured to the end of the sleeve 35 whereby it is directly connected to the differential housing 28. The driven clutch element 53 is provided with an internal clutch element 54 which is complementary to the clutch element 52 on the reverse sliding gear 51. By shifting the reverse sliding gear 51 into engagement with the clutch element 53, the former is brought into direct engagement with the sleeve 35 and the housing 28, thereby rotating the housing 28 in the same direction as the shaft 7, but at the aforesaid reverse for the purpose to be hereinafter described.

The nature of the differential 12 is such that when the bevel gear 23 and the housing 28 are rotated at the same speed, then the whole differential gearing rotates as one unit, thereby rotating the bevel gears 23 and 27 and the shafts 7 and 9 at the same speed. When the housing 28 is rotated at half the speed of the rotation of the shaft 7 and the bevel gear 23, then on account of the differential action of the differential bevel gears 33, the bevel gear 27 and shaft 9 are at a standstill. Any rotation of the differential housing 28 in the same direction as the shaft 7, but at a speed lower than that of the rotation of the shaft 7 and higher than half the speed of the rotation of the shaft 7, will result in the rotation of the gear 27 and the shaft 9 in the same direction as shaft 7 but at a speed lower than that of the shaft 7. Thus, when the gear 37 is shifted into engagement with the housing 28, the ratio between the gears 21 and 37 being such as to rotate the gear 37 at a speed more than half of the speed of the shaft 7, the housing is also rotated in the same direction as the shaft 7 but at a speed more than half of the clutch shaft speed, which will result in the rotation of the driven shaft 9 at the desired low speed. On account of the gear ratio between the gear 19 and the gear 46 when the sliding gear 46 is in driving engagement with the housing 28, the housing will be rotated in the same direction as previously, but at a higher speed than that of the gear 37, thereby rotating the driven shaft 9 at a desired second speed. When the high speed clutch element 48 is shifted into driving connection with the internal clutch element 50 of the main drive gear 13, then the housing 28 is directly connected to the main driving gear 13, and the shaft 7, the differential 12, and the shaft 9 will rotate as one unit at high speed.

When all the sliding gears are disconnected and the reverse sliding gear 51 is brought into driving engagement with the driven element 53, then the housing 28 will be rotated in the same direction as the shaft 7, but on account of the gear ratio between the gears 22 and 51, it will be rotated at a lower speed than half of the speed of rotation of the shaft 7, whereby the differential action of the differential 12 will cause the shaft 9 to rotate in a direction opposite to the rotation of the shaft 7 and at the desired reverse speed.

It will be recognized that a particularly efficient transmission is provided to accomplish the power transmission with a minimum loss of power and without gear clashing.

The differential 12 is rotated always in the same direction and the sliding gears are constantly in mesh with the respective countershaft gears. The speed of rotation at the power take-off end of the transmission is determined by the differential 12, in accordance with the difference of speed between the rotation of the driving shaft and that of the differential housing. The transmission combines sensitivity of action and flexibility as to different speed ratios, with a ruggedness of construction and positiveness of operation especially adapting it for its use.

Although the transmission heretofore illustrated and described is so designed as to bring the driven shaft to a standstill when the differential housing is rotated at half the speed of rotation of the driving shaft, it is to be noted that the differential may be so designed that it causes the driven shaft to come to a standstill at any other ratio of speed between the driving shaft and the housing. For instance, the differential gear ratio may be such as to bring the driven shaft to a standstill when the housing is rotated at one-third or one-fourth, or one-fifth, or any other fraction of the speed of rotation of the driving shaft.

Having thus described my invention, what I now claim as novel and desire to secure as Letters Patent is:

I claim:

1. A transmission comprising a driving shaft, a driven shaft, a differential housing having sleeves thereon rotatably supported on said shafts; a differential gearing in said housing adapted to transmit the differential speed of the speeds of said driving shaft and of said housing to the driven shaft; selective gears having clutch elements slidable on said sleeve into or out of driving engagement with said housing, and transmitting means for driving said selective gears at various speeds.

2. A transmission comprising a driving shaft, a driven shaft, a differential housing having sleeves thereon rotatably supported on said shafts; a differential gearing in said housing adapted to transmit the differential speed of the speeds of said driving shaft and of said housing to the driven shaft; selective gears provided with clutches slidable on said sleeve into or out of driving engagement with said housing, and transmitting means for driving said selective gears at various speeds, said transmitting means being driven by said driving shaft.

3. A transmission comprising a driving shaft, a driven shaft, a driving gear on the driving shaft, a differential housing having sleeves thereon rotatably supported on the shafts; a bevel gear on the adjacent end of each shaft, differential gearing rotatably mounted on the housing for driving said driven shaft at a differential speed; a high-speed clutch element slidable on the sleeve and adapted to directly connect said housing to the driving gear; a second speed gear slidable on the sleeve; a low speed gear slidable on the sleeve; a reverse gear slidable on the sleeve, said second, low, and reverse gears being adapted to be brought into driving engagement with the housing; and transmission means for rotating said second and low speed gears at a speed lower than the speed but higher than half the speed of rotation of the driven shaft and for rotating said reverse gear at a speed lower than half the speed of rotation of said driving shaft.

4. A transmission comprising a driving shaft, a driven shaft, a driving gear on the driving shaft, a differential housing having sleeves thereon rotatably supported on the shafts; a bevel gear on the adjacent end of each shaft, differential gearing rotatably mounted on the housing for driving said driven shaft at a differential speed; a high speed clutch element slidable on the sleeve and adapted to directly connect said housing to the driving gear; a second speed gear slidable on the sleeve; a low speed gear slidable on the sleeve; a reverse gear slidable on the sleeve, said second, low, and reverse gears being adapted to be brought into driving engagement with the housing; and transmission means for rotating said second and low speed gears at a speed lower than the speed but higher than half the speed of rotation of the driven shaft and for rotating said reverse gear at a speed lower than half the speed of rotation of said driving shaft, said transmission means being driven by said driving shaft.

5. A transmission comprising a driving shaft, a driven shaft, a driving gear having an internal clutch element on the driving shaft, a differential housing having sleeves thereon rotatably supported on the shafts; a bevel gear on the adjacent end of each shaft, differential gearing rotatably mounted on the housing for driving said driven shaft at a differential speed; a high speed clutch element slidable on the sleeve and adapted to directly connect said housing to the driving gear; a second speed gear slidable on the sleeve; a low speed gear slidable on the sleeve; a reverse gear slidable on the sleeve, said second, low, and reverse gears being adapted to be brought into driving engagement with the housing; transmission means for rotating said second and low speed gears at a speed lower than the speed but higher than half the speed of rotation of the driven shaft and for rotating said reverse gear at a speed lower than half the speed of rotation of said driving shaft, said transmission means being driven by said driving shaft; and means for selectively engaging said second, low, and reverse gears with the housing.

In testimony whereof I affix my signature.

BYRON STEVENS.